(12) United States Patent
Jacobsen

(10) Patent No.: US 10,258,054 B2
(45) Date of Patent: Apr. 16, 2019

(54) CONVEYING AND DISTRIBUTING APPARATUS FOR SLAUGHTERED FISH

(71) Applicant: Nordischer Maschinenbau Rud. Baader GmbH + Co. KG, Lubeck (DE)

(72) Inventor: Ulf Jacobsen, Bad Schwartau (DE)

(73) Assignee: Nordischer Maschinenbau Rud. Baader GMBH + Co. KG, Lubeck (DE)

( * ) Notice: Subject to any disclaimer, the term of this patent is extended or adjusted under 35 U.S.C. 154(b) by 0 days.

(21) Appl. No.: 15/502,179

(22) PCT Filed: Jun. 24, 2015

(86) PCT No.: PCT/EP2015/064232
§ 371 (c)(1),
(2) Date: Feb. 6, 2017

(87) PCT Pub. No.: WO2016/020105
PCT Pub. Date: Feb. 11, 2016

(65) Prior Publication Data
US 2017/0231239 A1    Aug. 17, 2017

(30) Foreign Application Priority Data
Aug. 5, 2014   (EP) .................................. 14179902

(51) Int. Cl.
*A22C 25/00* (2006.01)
*A22C 25/08* (2006.01)
(Continued)

(52) U.S. Cl.
CPC .............. *A22C 25/08* (2013.01); *A22C 25/04* (2013.01); *A22C 25/12* (2013.01); *B07C 5/28* (2013.01);
(Continued)

(58) Field of Classification Search
CPC ......... A22C 25/00; A22C 25/04; A22C 25/06; A22C 25/142
(Continued)

(56) References Cited

U.S. PATENT DOCUMENTS 4,829,635 A * 5/1989 Tonnies ................... A22B 3/00
128/202.12
5,582,283 A  12/1996 Arnarson
(Continued)

FOREIGN PATENT DOCUMENTS

CA      2190453 C       10/2003
CL   2007002297 A1      1/2008
(Continued)

OTHER PUBLICATIONS

International Preliminary Report on Patentability dated Feb. 7, 2017 from International Patent Application No. PCT/EP2015/064232 filed Jun. 24, 2015.
(Continued)

*Primary Examiner* — Richard T Price, Jr.
(74) *Attorney, Agent, or Firm* — David B. Tingey; Bryant J. Keller; Kirton McConkie

(57) ABSTRACT

The present invention relates to a conveying and distributing apparatus for delivering fish slaughtered by means of a plurality of slaughtering machines to at least one distributing device, comprising longitudinal conveyors downstream of each of the slaughtering machines, which are configured to receive the slaughtered fish longitudinally in a head to tail orientation, wherein each of the longitudinal conveyors comprises a weighing device for detecting the weight of the slaughtered fish, at least one first transfer device is arranged on each of the longitudinal conveyors, which are designed and configured to transfer the slaughtered fish to at least one transverse conveyor, wherein the at least one transverse
(Continued)

conveyor is adapted to receive the slaughtered fish transversely with respect to the head to tail orientation, a feed device arranged on the end of the transverse conveyor, which is designed and configured to remove the slaughtered fish from the transverse conveyor and to feed the same to a distributing device, and a control device, wherein the control device comprises a position tracking means for tracking the respective positions of slaughtered fish and an allocation means for allocating the detected weights to the respective tracked positions of the slaughtered fish, and wherein the control device is designed and configured to control the distributing device on the basis of the detected weights when the slaughtered fish enter the distributing device according to a predefined distribution rule. The invention further relates to a corresponding arrangement and a corresponding method.

13 Claims, 1 Drawing Sheet

(51) Int. Cl.
  *A22C 25/04* (2006.01)
  *A22C 25/12* (2006.01)
  *B07C 5/28* (2006.01)
  *B65G 15/08* (2006.01)
  *B65G 43/10* (2006.01)
(52) U.S. Cl.
  CPC ............ *B65G 15/08* (2013.01); *B65G 43/10* (2013.01); *B65G 2203/0258* (2013.01)
(58) Field of Classification Search
  USPC ................................................ 452/177–180
  See application file for complete search history.

(56) References Cited

U.S. PATENT DOCUMENTS

| | | | |
|---|---|---|---|
| 5,768,984 A | | 6/1998 | Gallego |
| 7,662,030 B2* | | 2/2010 | Cheek .................... A22B 3/005 452/57 |
| 2005/0009463 A1 | | 1/2005 | Grosseholz et al. |

FOREIGN PATENT DOCUMENTS

| | | |
|---|---|---|
| CL | 201103087 | 12/2011 |
| CN | 102458133 A | 5/2012 |
| EP | 2433500 A1 | 3/2012 |
| FR | 2633898 A1 | 1/1990 |
| GB | 2116732 A | 9/1983 |
| JP | H0850052 A | 2/1996 |
| WO | 9608975 A1 | 3/1996 |
| WO | 2003/013262 A1 | 2/2003 |
| WO | 2008/129564 A1 | 10/2008 |
| WO | 2010/142413 A1 | 12/2010 |

OTHER PUBLICATIONS

International Search Report dated Oct. 27, 2015 from International Patent Application No. PCT/EP2015/064232 flied Jun. 24, 2015.
Ibtrade foodmachines: Big Marel Grader/Batcher for sale 8 stations for Whole cod, Haddock Pollack, Dec. 15, 2012 (Dec. 16, 2012), XP054975671, Gefunden im Internet: URL: https://www.youtube.com/watch?v=VC2x00P2W9x&feature=youtu.be [gefunden am Jan. 14, 2015] das ganze Dokument.
Office Action dated Apr. 23, 2018 from Chinese Patent Application No. 201580040857.9.
Exam Report dated Jun. 14, 2018 from Chilean Patent Application No. CL00055-2017.

* cited by examiner

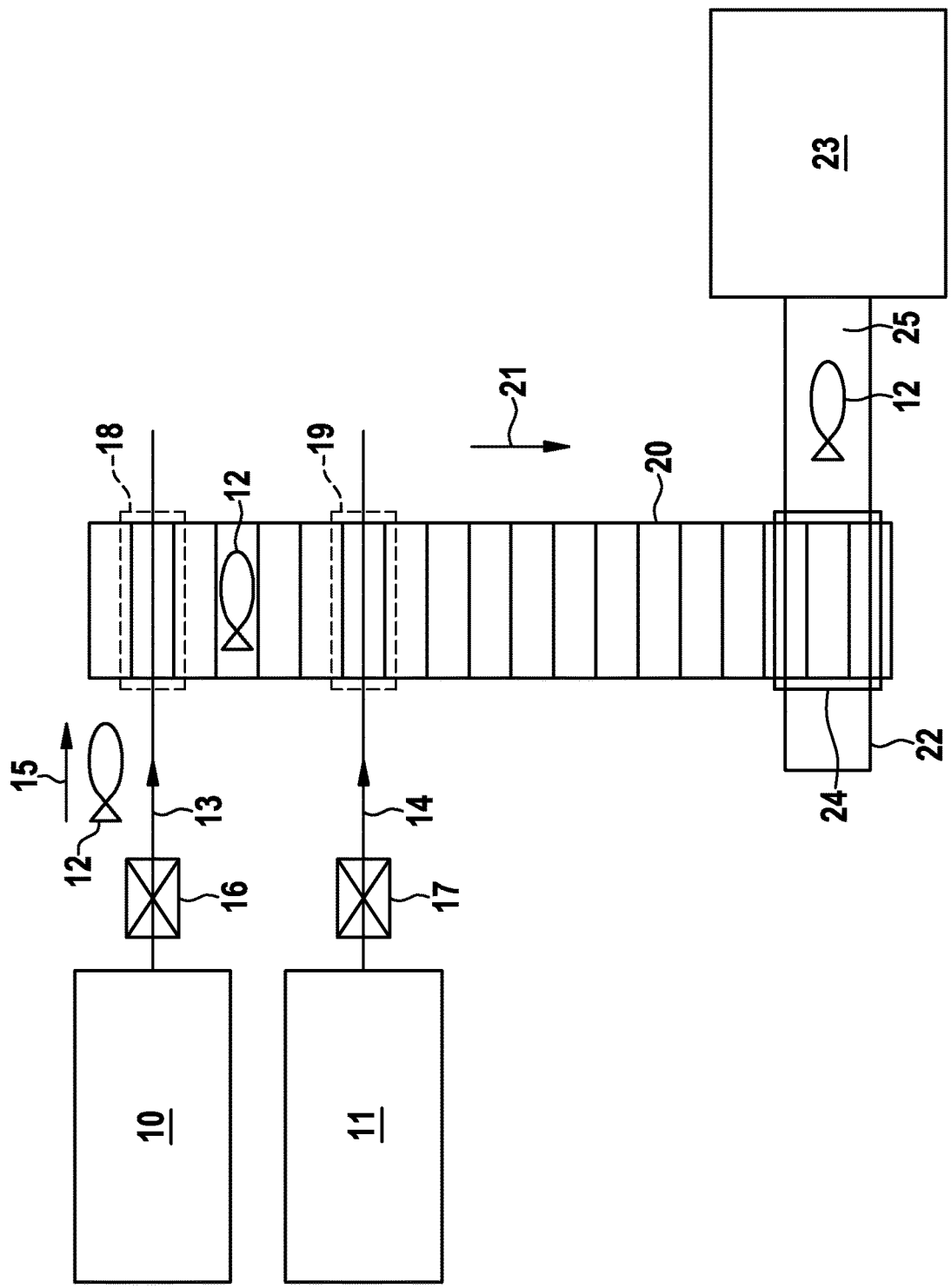

CONVEYING AND DISTRIBUTING APPARATUS FOR SLAUGHTERED FISH

CROSS REFERENCE TO RELATED APPLICATION(S)

This application is a U.S. National Stage Entry of International Patent Application No. PCT/EP2015/064232, filed Jun. 24, 2015, which claims the benefit of European Patent Application No. 14179902.3-1655, filed Aug. 5, 2014, the disclosures of which are hereby incorporated entirely herein by reference.

BACKGROUND

The present invention relates to a conveying and distributing apparatus for delivering fish slaughtered by means of a plurality of slaughtering machines to at least one distributing device. In addition, the invention relates to an arrangement for processing fish and a method for conveying and distributing fish slaughtered by means of a plurality of slaughtering machines.

Such conveying and distributing apparatuses, arrangements for processing fish and such methods are used in particular when processing items in the fish and meat processing industry. In particular, during the processing of fish that are slaughtered by means of slaughtering machines and are then transported to further treatment or processing stations.

The slaughtered fish are distributed by means of distributing devices according to various characteristics, for example weight, shape, size, length, width, height, colour, K factor, etc. Distributing, for example, can be to various containers or to further conveyor belts.

If the slaughtered fish are to be distributed depending on their weight, a weighing machine is arranged upstream of the distributing unit by means of which the weight of each of the fish is measured or detected. It is determined depending on the recorded weight of each fish where the fish is to be distributed to. By means of the distributing apparatus, the fish are guided into the respectively provided containers or to the further conveyor belt respectively provided for distribution.

The disadvantage of the known conveying and distributing apparatuses is that at high throughput rates the weighing systems used at the entrance to the distributing unit only have a relatively short time period available for detecting the weight. Thus high requirements are placed on such weighing systems with regard to their measuring and processing speed. The use of such high-speed weighing systems is usually associated with high costs and complicated measuring technology and limits the total capacity or total throughput rate to an upper limit value which is predetermined by the maximum processing rate of the one weighing system.

It is therefore the object of the present invention to create a cost-effective conveying and distributing apparatus with the highest possible throughput rate. The object is also to propose a corresponding method and a corresponding arrangement for processing fish.

The object is achieved by the conveying and distributing apparatus referred to hereinbefore comprising longitudinal conveyors downstream of each of the slaughtering machines, which are configured to receive the slaughtered fish longitudinally in a head to tail orientation, wherein the first longitudinal conveyors comprise a weighing device each for detecting the weight of the slaughtered fish, at least one first transfer device is arranged on each of the longitudinal conveyors, which are designed and configured to transfer the slaughtered fish to at least one transverse conveyor, wherein the at least one transverse conveyor is adapted to receive the slaughtered fish transversely with respect to the head to tail orientation, a feed device arranged on the end of the transverse conveyor, which is designed and configured to remove the fish from the transverse conveyor and to feed the same to a distributing device, and a control device, wherein the control device comprises a position tracking means for tracking the respective positions of the slaughtered fish and an allocation means for allocating the detected weights to the respective tracked positions of the slaughtered fish, and wherein the control device is designed and configured to control the distributing device on the basis of the detected weights when the slaughtered fish enter the distributing device according to a predefined distribution rule. A particular advantage of the invention is that the weights of the slaughtered fish are detected by means of the weighing devices arranged in each longitudinal conveyor immediately downstream of each of the slaughtering machines and the control device is configured to process these weight data. The control device is preferably further designed to relate the detected weight data to the locations of the slaughtered fish. In other words, the control device knows the current position of each of the slaughtered fish and its weight at any time.

Head to tail orientation within the meaning of this invention is understood as the longitudinal axis of the slaughtered fish, that is a notional axis running from the head of the fish to the tail fin. The longitudinal conveyors are configured such that the slaughtered fish are conveyed in a direction parallel to the notional longitudinal axis. This includes both conveying the slaughtered fish head section first and also conveying the fish tail section first.

Especially preferably, two or more slaughtering machines are arranged adjacent to each other as parallel production lines. The total throughput rate, that is the number of fish per unit of time, therefore emerges from the sum of the partial throughput rates of each slaughtering machine with downstream longitudinal conveyor.

Due to the position tracking means, the detected weights of the slaughtered fish are detected in each of the production lines. When the slaughtered fish enter the distributing device, the corresponding weight of the fish is already known to the control device. Thus detecting the weights of the slaughtered fish on entering the distributing device—as is known in the prior art—is no longer necessary. In this way, it is possible to dispense with the use of a weighing device with a high throughput rate which is associated with high costs. Another advantage is that, in the event of a breakdown of one or more of the weighing devices, the whole production process does not come to a standstill.

Especially preferably, the first longitudinal conveyors are driven in such a way that the slaughtered fish are transferred to the transverse conveyor by means of the first transfer device in a synchronised manner. In other words, the first longitudinal conveyors and the at least one transverse conveyor are designed and configured in such a way that a plurality of the first longitudinal conveyors feed the slaughtered fish to one of the transverse conveyors. The throughput rate, namely the number of fish per unit of time, of the transverse conveyor thus preferably corresponds to the sum of the individual throughput rates of the respective slaughtering machines or the respective longitudinal conveyors.

An expedient embodiment of the invention is characterised in that the position tracking means is configured to determine the positions of the slaughtered fish based on the respective conveying speeds of the longitudinal and transverse conveyors. Thus, the positions of the slaughtered fish can be tracked in a particularly easy manner by means of the control device. For this, the control device is advantageously equipped with means for detecting the individual conveying speeds. Alternatively, the control device itself is designed and configured to specify the respective conveying speeds. In both cases there are data in the control device that represent the respective conveying speeds. The position tracking means is further configured to precisely determine, from data present in digital form relating to the geometry of the entire conveyor apparatus, the positions of the slaughtered fish dependent on said conveying speeds at any time.

A preferred development of the invention is characterised in that the conveying capacity of the transverse conveyor is greater than or equal to the sum of the respective conveying capacities of the longitudinal conveyors. Conveying capacities are understood as the number of fish conveyed per unit of time. This has the advantage that each of the weighing devices only needs to be dimensioned for a fraction of the total throughput rate present at the distributing device. If N denotes the number of longitudinal conveyors or slaughtering machines and Dtot the total throughput rate of the distributing device, then the maximum partial throughput rate required for each of the weighing devices is D=Dtot/N.

According to another preferred development of the invention, at least the at least one transverse conveyor comprises a troughed belt conveyor. The troughed belt conveyor has the advantage that the slaughtered fish are conveyed essentially stationary in relation to the troughed belt conveyor. Slipping of the slaughtered fish is largely excluded such that it is possible by means of the position tracking means to determine the position of the slaughtered fish with a high degree of precision.

A further expedient embodiment of the invention is characterised in that the first transfer devices each comprise a position determination device for detecting the transfer of the slaughtered fish and the control device is connected to the respective position determination devices for transmitting the respective positions of the slaughtered fish. In this way, the position of the fish can be determined precisely. In particular, possible positioning errors, which can occur when conveying the fish by means of the longitudinal conveyors, for example due to the occurrence of slippage, can thus be corrected. In other words, the control device is adapted, based on the position determination device, to precisely determine the current position of the slaughtered fish in each case.

According to a further preferred embodiment, the feed device comprises an acceleration device which is configured to pre-accelerate the fish in a head to tail direction. A further longitudinal conveyor for transferring the slaughtered fish and conveying the same to the distributing device is arranged downstream of the acceleration device. The additional transfer of the slaughtered fish to a further longitudinal conveyor has the advantage that they can be distributed in a simple manner in the distributing device by means of transverse removal. By means of the acceleration device, the slaughtered fish are pre-accelerated into the new longitudinal conveyor and preferably accelerated to a speed which corresponds to the conveying speed of the further longitudinal conveyor. In this way, the slaughtered fish are deposited slip-free on the further longitudinal conveyor since, at the exit of the acceleration device, the difference in speed between the slaughtered fish and the further longitudinal conveyor approaches zero.

In addition, the object is achieved by the arrangement referred to hereinbefore, comprising at least two slaughtering machines for slaughtering fish and at least one conveying and distributing apparatus according to any one of claims 1 to 6 for delivering fish slaughtered by means of the slaughtering machines to at least the distributing device of the distributing apparatus.

Finally, the object is also solved by the method referred to hereinbefore, comprising receiving the slaughtered fish in a head to tail orientation by means of first longitudinal conveyors, detecting the weight of the slaughtered fish, longitudinally conveying the slaughtered fish to a first transfer device, transferring the slaughtered fish to at least one transverse conveyor, transversely conveying the slaughtered fish transversely with respect to the head to tail orientation and feeding the same to a distributing device, tracking the respective positions of the slaughtered fish, allocating the detected weights to the respective tracked positions, controlling the distributing device on the basis of the detected weights when the slaughtered fish enter the distributing device according to a predefined distribution rule.

A further expedient embodiment of the invention is characterised in that the positions of the slaughtered fish are determined on the basis of the respective conveying speeds of the longitudinal and transverse conveyors.

According to a further preferred embodiment of the invention, transverse conveying is effected with a conveying capacity which is greater than or equal to the sum of the respective conveying capacities during longitudinal conveying.

A further preferred development of the invention is characterised in that the transverse conveying is effected by means of a troughed belt conveyor.

An expedient development of the invention is characterised in that on transferring the slaughtered fish from longitudinal to transverse conveying, the respective position of the slaughtered fish is determined at the first transfer devices.

According to an especially advantageous development, on feeding the slaughtered fish to the distributing device, the slaughtered fish are initially pre-accelerated in a head to tail direction and conveyed to the distributing device in a head to tail orientation.

To avoid repetition, with respect to the advantages of the method according to the invention, reference is made to the advantages already described in connection with the apparatus according to the invention from which the advantages already mentioned in connection with the apparatus emerge in an analogous manner for the method.

BRIEF DESCRIPTION OF THE DRAWINGS

Further preferred and/or expedient features and embodiments of the invention emerge from the dependent claims and the description. Especially preferred embodiments are explained in greater detail with reference to the attached drawing. The drawing shows:

FIG. 1 a schematic view of the arrangement according to the invention which comprises the conveying and distributing apparatus.

FIG. 1 shows the arrangement according to the invention and the conveying and distributing apparatus according to the invention. For the sake of clarity, the method according to the invention will also be explained below.

FIG. 1 shows two slaughtering machines 10, 11 by way of example. The present invention, however, is not limited to two slaughtering machines. In fact, any number of slaughtering machines 10, 11 greater than two can be used.

DETAILED DESCRIPTION OF EMBODIMENTS

Fish—not shown in the drawing—are fed to each of the slaughtering machines 10, 11 on the entry side. The slaughtered fish 12 leave the slaughtering machines 10, 11 on the exit side. Longitudinal conveyors 13, 14 are arranged downstream of each of the slaughtering machines. The longitudinal conveyors are preferably configured to convey the slaughtered fish 12 in the longitudinal direction 15. The longitudinal direction describes a notional axis between head and tail of the slaughtered fish 12.

It is shown in the drawing that the slaughtered fish 12 leave the respective slaughtering machines 10, 11 head first. According to an advantageous further development of the invention—not shown in the drawing—the slaughtering machines 10, 11 are configured in such a manner that the slaughtered fish 12 leave the respective slaughtering machines 10, 11 tail first. In this case, it is particularly advantageous if the slaughtering machines 10, 11 and the distributing device 23 are arranged on the same side of the transverse conveyor 20 such that the slaughtered fish 12 are delivered to the distributing device 23 head first. A corresponding arrangement of the slaughtering machines 10, 11 emerges from FIG. 1 if the slaughtering machines 10, 11 are arranged in mirror image to the transverse conveyor 20 such that the slaughtering machines 10, 11, the transverse conveyor 20, the feed device 22 and the distributing device are arranged in a U shape.

The first longitudinal conveyors 13, 14 preferably each comprise a weighing device 16, 17. The weighing devices 16, 17 are each designed and configured for detecting the weight of the slaughtered fish 12. For example, the weighing devices 16, 17 are analogue or digital scales which measure the weight of the slaughtered fish 12 as they are conveyed past and convert it into corresponding analogue or digital electrical signals. Alternatively, the weighing devices 16, 17 are integrated in the respective slaughtering machines 10, 11.

At least one first transfer device 18, 19 in each case is arranged on each of the longitudinal conveyors 13, 14. The transfer devices 18, 19 are designed to transfer the slaughtered fish 12 to a transverse conveyor 20.

Alternatively, a plurality of transverse conveyors 20 are arranged parallel to each other. The transverse conveyor 20 is configured in such a manner that, after transfer by means of the transfer device 18, the slaughtered fish are conveyed transversely to the previously referred to head to tail orientation. The corresponding transverse direction 21 indicates the conveying direction of the slaughtered fish 12 after the transfer.

A feed device 22 is arranged at the end of the transverse conveyor 20. The feed device 22 is preferably configured to remove the slaughtered fish 12 from the transverse conveyor 20 and feed them to a distributing device 23. The distributing device 23 preferably comprises controlled deflectors—not shown in the drawing—by means of which the slaughtered fish 12 are distributed, for example, to various containers or to further conveyor belts. Such distributing devices 23 are sufficiently well-known from the prior art which is why a more detailed description is dispensed with below.

A control device—not shown in FIG. 1—comprises a position tracking means on the one hand and allocating means on the other hand. The position tracking means are preferably designed and configured in such a manner that the respective position of the slaughtered fish 12 is tracked.

For example, the position tracking means comprises a digital arithmetic logical unit by means of which the current location of each slaughtered fish 12 can be determined from the known conveying speeds of the conveyors 13, 14, 20.

Alternatively, the position tracking means comprise further sensors that exclusively or additionally permit position determination of the slaughtered fish 12.

The allocating means are designed to allocate the detected weights of the slaughtered fish 12 to the respective tracked positions of said slaughtered fish 12. In other words, the position tracking and allocating means form a tracking system by means of which the location of each slaughtered fish 12 together with the respectively detected weight is determined at any time.

The control device is further designed to control the distributing device 23. The control of the distributing device 23 is effected on the basis of the detected weights when the slaughtered fish 12 enter. For this purpose, a predefined distribution rule is stored, for example as a data set, in the control device. For example, if the slaughtered fish 12 are to be distributed according to different weight classes, the distribution rule comprises the desired weight classes according to which the distributing device 23 is to be controlled by means of the control device.

Preferably, the control device comprises corresponding input and output interfaces via which on the one hand the weighing devices 16, 17 transmit the measured weight data of the slaughtered fish 12 to the control device and on the other hand corresponding output interfaces which are used to control the distributing device 23 according to the distribution rule.

Advantageously, the position tracking means is configured in such a way that it determines the positions of the slaughtered fish 12 based on the conveying speeds of the longitudinal and transverse conveyors. As described hereinbefore, there are various options for technical implementation.

Especially preferably, in each case the first transfer devices 18, 19 each comprise a position determination device. By means of this position determination device, the time of transfer of the slaughtered fish 12 and therefore their exact position on transfer is detected. The control device is connected to the position determination device such that the results of the position determination device are incorporated in the position determination of the slaughtered fish 12. The control device is preferably designed as a digital controller, for example in the form of a microprocessor controller or as a programmable logic controller (PLC).

According to a further advantageous embodiment, the feed device 22 comprises an acceleration device 24. The acceleration device 24 is designed and configured to pre-accelerate the slaughtered fish 12 in a head to tail direction. In other words, the acceleration device 24 is adapted to accelerate the slaughtered fish parallel to their head to tail orientation. In this way, the slaughtered fish 12 are accelerated in their longitudinal direction. Especially preferably, the slaughtered fish are accelerated to a final speed which corresponds to the conveying speed of a further longitudinal conveyor 25. The longitudinal conveyor 25 is configured to feed the slaughtered fish 12 to the distributing device.

The invention claimed is:

1. A conveying and distributing apparatus for delivering fish slaughtered by a plurality of slaughtering machines to at least one distributing device, comprising longitudinal conveyors downstream of each of the slaughtering machines, which are configured to receive the slaughtered fish longitudinally in a head to tail orientation, wherein each of the longitudinal conveyors comprises a weighing device for detecting the weight of the slaughtered fish, at least one first transfer device is arranged on each of the longitudinal conveyors, which are designed and configured to transfer the slaughtered fish to at least one transverse conveyor, wherein the at least one transverse conveyor is adapted to receive the slaughtered fish transversely with respect to the head to tail orientation, a feed device arranged on the end of the transverse conveyor, which is designed and configured to remove the slaughtered fish from the transverse conveyor and to feed the same to a distributing device, and a control device, wherein the control device comprises a position tracking means for tracking the respective positions of slaughtered fish and an allocation means for allocating the detected weights to the respective tracked positions of the slaughtered fish, and wherein the control device is designed and configured to control the distributing device on the basis of the detected weights when the slaughtered fish enter the distributing device according to a predefined distribution rule.

2. The apparatus according to claim 1, characterised in that the position tracking means is configured to determine the positions of the slaughtered fish based on the respective conveying speeds of the longitudinal and transverse conveyors.

3. The apparatus according to claim 1, characterised in that the conveying capacity of the transverse conveyor is greater than or equal to the sum of the respective conveying capacities of the longitudinal conveyors.

4. The apparatus according to claim 1, characterised in that at least the at least one transverse conveyor comprises a troughed belt conveyor.

5. The apparatus according to claim 1, characterised in that the first transfer devices respectively each comprise a position determination device for detecting the transfer of the slaughtered fish and the control device is connected to the respective position determination devices for transmitting the respective positions of the slaughtered fish.

6. The apparatus according to claim 1, characterised in that the feed device comprises an acceleration device, which is configured to pre-accelerate the slaughtered fish in a head to tail direction, and a further longitudinal conveyor for transferring the slaughtered fish and conveying the same to the distributing device downstream of the acceleration device.

7. An arrangement for processing fish, comprising
at least two slaughtering machines for slaughtering fish and
at least one conveying and distributing apparatus according to claim 1 for delivering fish slaughtered by the slaughtering machines to at least the distributing device of the distributing apparatus.

8. A method for conveying and distributing fish slaughtered by plurality of slaughtering machines, comprising
receiving the slaughtered fish in a head to tail orientation by longitudinal conveyors,
detecting the weight of the slaughtered fish,
longitudinally conveying the slaughtered fish to a first transfer device,
transferring the slaughtered fish to at least one transverse conveyor,
transversely conveying the slaughtered fish transversely with respect to the head to tail orientation and feeding the same to a distributing device,
tracking the respective positions of the slaughtered fish,
allocating the detected weights to the respective tracked positions,
controlling the distributing device on the basis of the detected weights when the slaughtered fish enter the distributing device according to a predefined distribution rule.

9. The method according to claim 8, characterised in that the positions of the slaughtered fish are determined based on the respective conveying speeds of the longitudinal and transverse conveyors.

10. The method according to claim 8, characterised in that transverse conveying is effected with a conveying capacity which is greater than or equal to the sum of the respective conveying capacities during longitudinal conveying.

11. The method according to claim 8, characterised in that transverse conveying is effected by a troughed belt conveyor.

12. The method according to claim 8, characterised in that, on transferring the slaughtered fish from longitudinal to transverse conveying, the respective position of the slaughtered fish is determined at the first transfer devices.

13. The method according to claim 8, characterised in that on feeding the slaughtered fish to the distributing device, the slaughtered fish are initially pre-accelerated in a head to tail direction and conveyed to the distributing device in the head to tail orientation.

* * * * *